United States Patent [19]

Yoshikawa

[11] Patent Number: 5,659,154
[45] Date of Patent: Aug. 19, 1997

[54] METHOD AND APPARATUS FOR COORDINATE DETECTION

[75] Inventor: Osamu Yoshikawa, Tokyo, Japan

[73] Assignee: SMK Corporation, Tokyo, Japan

[21] Appl. No.: 231,144

[22] Filed: Apr. 22, 1994

[30] Foreign Application Priority Data

Apr. 23, 1993 [JP] Japan ................................ 5-120882

[51] Int. Cl.$^6$ ............................................ G08C 21/00
[52] U.S. Cl. .................................................. 178/20
[58] Field of Search ............................ 178/18, 19, 21; 345/173, 175

[56] References Cited

U.S. PATENT DOCUMENTS

| | | | |
|---|---|---|---|
| 5,245,139 | 9/1993 | Protheroe et al. | 178/18 |
| 5,274,362 | 12/1993 | Potvin | 178/20 X |
| 5,324,895 | 6/1994 | Inamori | 178/20 X |

Primary Examiner—Stephen Chin
Assistant Examiner—Paul Loomis
Attorney, Agent, or Firm—Morrison Law Firm

[57] ABSTRACT

A digitizing tablet includes stacked X and Y coordinate resistance boards (X-board and Y-board) with insulating beads therebetween. A CPU controls input and grounding switches of both X- and Y-boards and a selector switch. The selector switch connects an A/D converter input to grounding electrodes of the X and Y boards. The input switch of the X-board applies a supply potential to an input electrode of the X-board while a grounding electrode of the X-board is disconnected from ground by the grounding switch. The Y-board is grounded at a grounding electrode while the input electrode of the Y-board floats. The A/D converter monitors a voltage at the grounding electrode of the X-board to detect a drop in potential from the supply potential. When contact pressure is applied to the digitizing tablet, current flows from the supply potential, through the X and Y boards via a contact point, and into ground via the Y-board grounding switch. The potential appearing at the grounding electrode of the X-board drops thus signaling contact. The CPU reads this change in potential and initiates a coordinate determination process. An alternate embodiment employs a voltage dropping resistor, in supply leads to the X and Y boards, which turns on a switching transistor when current is drawn, signaling an interrupt to the CPU, and initiating coordinate determination.

3 Claims, 4 Drawing Sheets

METHOD AND APPARATUS FOR COORDINATE DETECTION

BACKGROUND OF THE INVENTION

The present invention relates to a method and an apparatus for detecting coordinates selected using a pressure-sensitive resistive digitizing tablet employed in digitizing and providing for stylus computer input. More particularly, the present invention relates to a method and apparatus for initiating a coordinate detection operation and simplifying the circuitry required therefor.

Pressure-sensitive resistance tablets have been used for providing stylus inputs to computers, for example in the area of computer automated design where blueprints and schematics are entered into a computer database. Such tablets have an X-coordinate resistance board facing a Y-coordinate resistance board separated by small insulating beads interposed between the two boards. The two boards are placed in contact with one another at a point of contact where a stylus, or other object, exerts pressure deflecting one board into contact with the other. The X and Y coordinate resistance boards each have a reference electrode on a first edge and a ground electrode on an opposing second edge. Each board is oriented such that a potential gradient in each is oriented in its respective direction, X and Y respectively. Each of the reference electrodes is selectively connected to $V_{cc}$ via a switch, and each of the ground electrodes is selectively connected to ground via a switch. Additionally, the ground electrode of the Y-coordinate board is connected to an X-input of a selector switch and the ground electrode of the X-coordinate board is connected to a Y-input of the selector switch. The selector switch selectively applies one of the X and Y inputs to a pull-down resistor, selectively connected to ground by a grounding switch, and an A/D converter input. All the switches are controlled by a CPU.

In order to determine the coordinates of the point of contact the CPU operates the switches so as channel voltages to the A/D converter representative of the X and Y coordinates. To measure the X coordinate, $V_{cc}$ and ground are applied to the X-coordinate board via the respective switches and the selector switch is set to X-input which connects to the ground electrode of the Y-coordinate board. All other switches remain open, including the grounding switch. In this configuration, the X-coordinate board functions as a resistive divider wherein a point of division is the point of contact. The potential at the point of contact is applied to the A/D converter via the Y-coordinate board and its grounding electrode (which is not connected to ground at this time), and the selector switch. The resistance of the Y-coordinate board is inconsequential because the A/D converter has a high impedance input and the pull-down resistor is disconnected from ground during this operation. Thus, the A/D converter digitizes the potential at the point of contact. The CPU then reads the digitized potential and determines an X-coordinate. Determination of the Y-coordinate is achieved similarly by closing switches to apply $V_{cc}$ and ground to the Y-coordinate board and opening switches applying the same to the X-coordinate board.

During operation the CPU must determine when inputs are made to the resistive tablet, that is, when a stylus is applied to the tablet, so that it can initiate the above coordinate determination process. In the disclosure of Japanese laid-open patent publication SN 4-80411, this task is accomplished by sensing a voltage across the pull-down resistor when the grounding switch of the pull-down resistor is closed to ground, $V_{cc}$ is applied to the input electrode of the X-coordinate resistance board, the selector switch is set to the X-input, and the remaining switches are set open. Basically, the pull-down resistor applies a ground potential to the A/D converter when there is no point of contact on the tablet. Without the pull-down resistor, the input to the A/D converter floats because the Y-coordinate board, whose grounding electrode is connected to the input of the A/D converter, is floating since both switches to its input electrode and grounding electrode are open. When a point of contact is made, a potential, other than ground, is applied to the pull-down resistor and the A/D converter input because the input electrode of the X-coordinate board has $V_{cc}$ applied to it by the closed switch. This potential is sensed by the A/D converter and the CPU initiates the coordinate measurement routine described above.

The above apparatus and method of measurement initiation has several drawbacks. First it requires an additional switch and resistor for grounding the A/D input. Second, the CPU must provide for control of the additional switch. And third, if the grounding switch were to be eliminated and the pull-down resistor permanently grounded, the advantage of the high input impedance of the A/D converter would be negated. This would lead to errors being introduced by stray resistances in connections leading to the A/D input and the lower impedance would introduce an additional voltage drop across the resistive tablet thereby lowering the resolution of the system.

Finally, the prior art digitizing apparatus often detects pressure using one of the X and Y coordinate boards as a resistive divider connected between $V_{cc}$ and ground with another one of the X and Y coordinate boards connected to the input of the A/D converter. In this configuration, the coordinate board connected as a resistive divider continuously bleeds current from $V_{cc}$ to ground. In battery powered applications, this current drain can significantly reduce an expected charge life of the batteries. Thus, room for improvement exists in construction and operation methods of resistive tablets.

OBJECTS AND SUMMARY OF THE INVENTION

Accordingly, it is an object of the invention to provide a digitizing tablet and a method of operation for the digitizing tablet which overcomes the drawbacks of the prior art.

It is also an object of the invention to provide a digitizing tablet operation method which minimizes a current drain produced by the digitizing tablet while in a standby mode awaiting input.

It is a further object of the invention to provide a digitizing tablet having an improved method of contact detection which does not require a pull-down resistor or a switch to ground the pull-down resistor.

It is a still further object of the invention to provide a digitizing tablet wherein one resistive board is connected to a first potential, a second resistive board is connect to a second potential, and an unconnected edge of one the two resistive boards is monitored for a change in voltage indicating that contact has been made with the digitizing tablet.

It is yet another object of the invention to provide a digitizing tablet which does not require a control unit to repetitively read an A/D output.

An object of the present invention is to provide a digitizing tablet wherein a change in potential resulting from contact pressure produces an interrupt signal applied to a CPU.

Briefly stated, the present invention provides a digitizing tablet, formed of stack X and Y coordinate resistance boards with insulating beads therebetween, which has a CPU for controlling input and grounding switches of both resistance boards and a selector switch. The selector switch connects an A/D converter input to grounding electrodes of the X and Y boards. The input switch of the X-board applies a supply potential to an input electrode of the X-board while a grounding electrode of the X-board is disconnected from ground by the grounding switch. The Y-board is grounded at a grounding electrode while the input electrode of the Y-board floats. The A/D converter monitors a voltage at the grounding electrode of the X-board to detect a drop in potential from the supply potential. When contact pressure is applied to the digitizing tablet current flows from the supply potential, through the X and Y boards via a contact point, and into ground via the Y-board grounding switch. The potential appearing at the grounding electrode of the X-board drops thus signaling contact. The CPU reads this change in potential and initiates a coordinate determination process. An alternate embodiment employs a voltage dropping resistor, in supply leads to the X and Y boards, which turns on a switching transistor when current is drawn, signaling an interrupt to the CPU, and initiating coordinate determination.

In accordance with these and other objects of the invention, there is provided a method for detecting contact pressure at a point of contact on a digitizing tablet having an X-board and a Y-board, which comprises: connecting a first edge of the X-board to a first potential and a first edge of the Y-board to a second potential, detecting a current flowing between the first and second potentials via the X-board, the point of contact, and the Y-board when the contact pressure is applied, and initiating a coordinate determination routine when the current is detected.

According to a feature of the invention, the detecting includes: monitoring a potential at a second edge of one of the X-board and the Y-board, the second edge opposing the first edge of the one of the X-board and the Y-board, providing means for producing a change in the potential responsive to the current, and detecting the change in the potential.

According to a further feature of the present invention the detecting includes providing a switching transistor responsive to the change in the potential, biasing the switching transistor such that a detection signal is generated by the change in the potential in response to a presence of the current, and initiating the coordinate determination routine by applying the detection signal to an interrupt of a controller.

The present invention also provides a digitizing tablet system having a contact detection apparatus comprising: a controller, a digitizing tablet having an X-board and a Y-board, each having a resistive surface, means for fixing the X and Y boards a predetermined distance apart such that a contact pressure applied to the digitizing tablet deflects one of the X and Y boards engaging the resistive surface of each with one another at a point of contact, the controller including connecting means for selectively connecting a first edge of the X-board to a first potential and a first edge of the Y-board to a second potential, detection means for detecting a current flowing between the first and second potentials via the X-board, the point of contact, and the Y-board in response to the contact pressure being applied, and the controller including an initiation means, responsive to the detection means, for initiating a coordinate determination routine when the current is detected.

One embodiment of the present invention provides the detection means including: an A/D converter having an input connected to the second edge of the one of the X-board and the Y-board, and the controller examining a digital output of the A/D converter for the change in the potential.

Another embodiment of the present invention provides for the detection means including a switching transistor responsive to the change in the potential, means for biasing the switching transistor such that a detection signal is generated by the change in potential in response to a presence of the current, and applying the detection signal to an interrupt of the controller to trigger the initiation means.

A still further feature of the present invention provides a digitizing tablet system further comprising the means for producing a change in the potential including interposing a current sensing resistor between the first edge of the one of the X-board and Y-board and a respective one of the first and second potentials connected thereto.

According to a still further feature of the invention, there is further provided a digitizing tablet system having a contact detection apparatus comprising: a controller, a digitizing tablet having an X-board and a Y-board each having a resistive surface, means for relatively fixing the X and Y boards a predetermined distance apart such that a contact pressure applied at a point of contact with the digitizing tablet deflects of one of the X and Y boards resulting in their respective resistive surfaces engaging one another at the point of contact, the X and Y boards each having opposing first and second edges respectively orthogonally oriented to each other, the controller including first means for selectively connecting a first edge of one of the X and Y boards to a first potential, the controller including second means for selectively connecting a second edge of another of the X and Y boards to a second potential, an A/D converter having an A/D input, the controller including a third means for selectively connecting the A/D input to one of the following: the second edge, of the one of the X and Y boards, and detecting a change in potential from the first potential, or the first edge, of the another of the X and Y boards, and detecting a change of potential from the second potential, and finally the controller including means for setting the first, second, and third means to a connecting state and initiating a coordinate determination routine upon detecting the change of potential.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Figure 1:
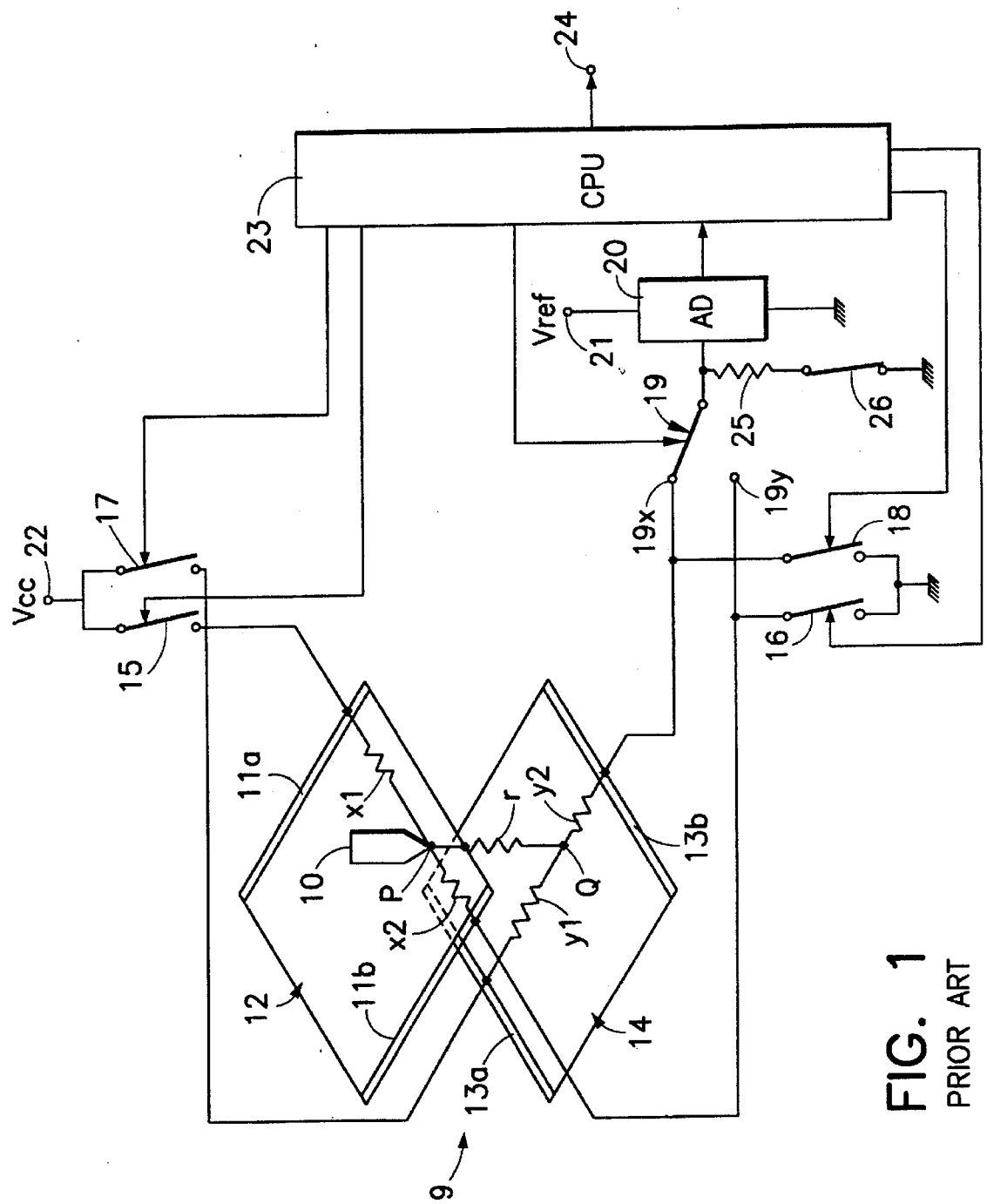
FIG. 1 is a circuit schematic of a prior art apparatus for detecting coordinates on resistive tablet.

Referring to FIG. 1, a circuit of a resistive tablet system disclosed in Japanese laid-open patent publication SN 4-80411 is shown. A resistive tablet 9 includes an X-coordinate resistance board (X-board) 12 and a Y-coordinate resistance board (Y-board) 14. The X and Y-boards, 12 and 14, have facing resistive surfaces that are assembled together with small insulating bead spacers (not shown) interposed therebetween. The X-board 12 has an input electrode 11a connected to a voltage potential $V_{cc}$ via X-board input switch 15 and a grounding electrode 11b communicated to ground via X-board grounding switch 16. The Y-board has input and grounding electrodes, 13a and 13b, similarly connected by a Y-board input switch 17 and a Y-board grounding switch 18. The grounding electrodes, 11b and 13b, are also connected to an input selector switch 19 which channels inputs to an input of an A/D converter 20. The Y-board grounding electrode 13b is connected to an X-input 19x of the selector switch 19 and the X-board grounding electrode 11b is connected to a Y-input 19y of the selector switch 19. As explained below, the Y-board 14 is used to determine a position on the X-board 12 and the X-board 12 is used to determine a position on the Y-board. A pull-down resistor 25 connects the input of the A/D converter 20 to ground via a grounding switch 26. All the switches, 15–18 and 26, are controlled by a CPU 23 which accepts data from the A/D converter 20.

When pressure is applied to a surface of the resistive tablet 9, for example by a stylus 10, a connection is made between the resistive surfaces of the X and Y boards, 12 and 14, at a point of contact where points P and Q of the respective boards connect. The connection has a contact resistance r. The CPU 23 determines X and Y coordinates of the point of contact by selectively operating the switches, 15–18 and 26, and reading data from the A/D converter 23.

In order to determine an X-coordinate, the CPU 23 closes the X-board input switch 15 and the X-board grounding switch 16 thereby applying the potential $V_{cc}$ across the electrodes, 11a and 11b, of the X-board 12. The selector switch 19 is set to connect the X-input 19x and the grounding electrode 13b of the Y-board 14 to the input of the A/D converter 23. All other switches are set open including the grounding switch 26, thus presenting the high input impedance of the A/D converter to the point of contact. A potential $V_p$, at the point of contact on the X-board 12, is digitized by the ND converter 23 and read by the CPU 23. The X-board 12 functions as a resistive divider network wherein the point of contact is the point of division. If resistances $x_1$ and $x_2$ are the resistances on either side of the point of contact to the corresponding electrodes, then $V_p$ is determined from the following equation:

$$V_p = \frac{Vcc \times x_2}{x_1 + x_2}$$

Since a potential gradient of the X-board 12 is linear, the resistances $x_1$ and $x_2$ are representative of distances from the point of contact to the electrodes, 11a and 11b, of the X-board 12.

The potential $V_{cc}$ is measured during an initialization process by connecting the input of the A/D converter 20 to $V_{cc}$ through either the X-board 12 or the Y-board 14 while setting the grounding switches, 16 and 18, open. Alternatively, a reference voltage $V_{ref}$, which is applied to the A/D converter 20, can be applied to the resistive tablet 9 in place of the potential $V_{cc}$. In such an embodiment, the CPU need not measure the reference voltage $V_{ref}$ as it does $V_{cc}$ since the reference voltage $V_{ref}$ is simply full scale of the A/D converter 20.

Thus, since the potentials $V_p$ and $V_{cc}$ are known and measured by the A/D converter, the above equation is solved and a position of the point of contact in the X-direction is determined. X-coordinate data, calculated by the CPU 23, is then output via data bus 24 to a host system.

Subsequent to the transmission of the X-position data, and while the point of contact has remained constant, the CPU initiates a Y-coordinate determination process. The Y-coordinate determination process is similar to the above process for determining the X-coordinate with the exception of the operation of the switches. To determine the Y-coordinate, the CPU 23 closes both the Y-board input and ground switches, 17 and 19, thereby setting up a linear potential gradient across the Y-board 14 in the Y-direction. The selector switch 19 is set to the Y-input, which is connected to the ground electrode 11b of the X-board 12, and the remaining switches are set open. Thus, a potential at a point of contact Q on the Y-board 14, $V_q$, is applied to the input of the A/D converter 20 via the X-board 14, specifically through the contact resistance r, the resistance $x_2$ of the X-board 12, and the selector switch 19. The CPU reads a digitized value of $V_q$ from the A/D converter. The Y-coordinate is then determined from the following equation.

$$V_q = \frac{Vcc \times y_2}{y_1 + y_2}$$

Since $V_{cc}$ and $V_q$ are known, the remaining ratio is proportionally related to the Y-coordinate of the point of contact.

The A/D converter circuit 20 has a high input impedance which renders the effect of the contact resistance r, an the X and Y board resistances, $x_2$ and $y_2$, negligible. However, due to this high input impedance, the input of the A/D converter is essentially floating when no contact is made with the tablet 9. A potential on the input meanders rendering meaningless data transmitted to the CPU 20. Thus, the CPU 20 cannot determine when contact has been made with the tablet 9 by monitoring the A/D converter 20 output. In order to remedy this problem, the prior art has incorporated a pull-down resistor 25 and a resistor grounding switch 26 which serve to selectively ground the input of the A/D converter 20. This permits a contact detection process to be effected.

The contact detection process is implemented by the CPU 23 entering a standby mode consisting of closing the X-board input switch 15 and the resistor ground switch 26, setting the selector switch 19 to the X-input 19x, and setting the remaining switches open. Thus, the input to the A/D converter is pulled to ground by the pull-down resistor 25 and only when pressure is applied to the tablet 9 does a current, and a resultant potential, exist at pull-down resistor 25. The CPU 23 then repeatedly reads the A/D converter 20 output. When pressure is applied, current will flow from $V_{cc}$ through resistances $x_1$, r, $y_2$, and the pull-down resistor 25, regardless of where the point of contact is made, increasing the potential at the input of the A/D converter 20. This increase is detected by the CPU 23 based on repeated readings of the A/D converter 20 output. The CPU 23 then initiates the above coordinate determination process.

Maximum system resolution is achieved by presenting as large a signal as possible to the input of the A/D converter 20 without exceeding an input range of the A/D converter 20. Generally, A/D converters divide a reference voltage and compare an input against divided reference voltage values or summed combinations thereof. Therefore, the upper limit of the A/D converter input is set by the reference voltage. In the system of FIG. 1, if the grounding switch 26 is removed and the pull-down resistor 25 tied to ground, the pull-down resistor 25 functions as a resistive divider reducing the voltage applied to the A/D converter 20 and thereby reduce the resolution of the system. Thus, the system of FIG. 1 requires that both the grounding switch 26 and the pull-down resistor be present.

Still other prior art systems-apply $V_{cc}$ and ground to the X-board 12, for example, via the X-board input switch 15 and the X-board grounding switch 16, allowing the X-board 12 to function as a resistive divider. The Y-board 14 is then connected to the input of the A/D converter 20 and the pull-down resistor 25 via the input selector switch 19. The use of the X-board 12 as a resistive divider during a standby mode results in excessive current drain from $V_{cc}$. The reduces a charge life of batteries used to power the prior art systems.

Figure 2:
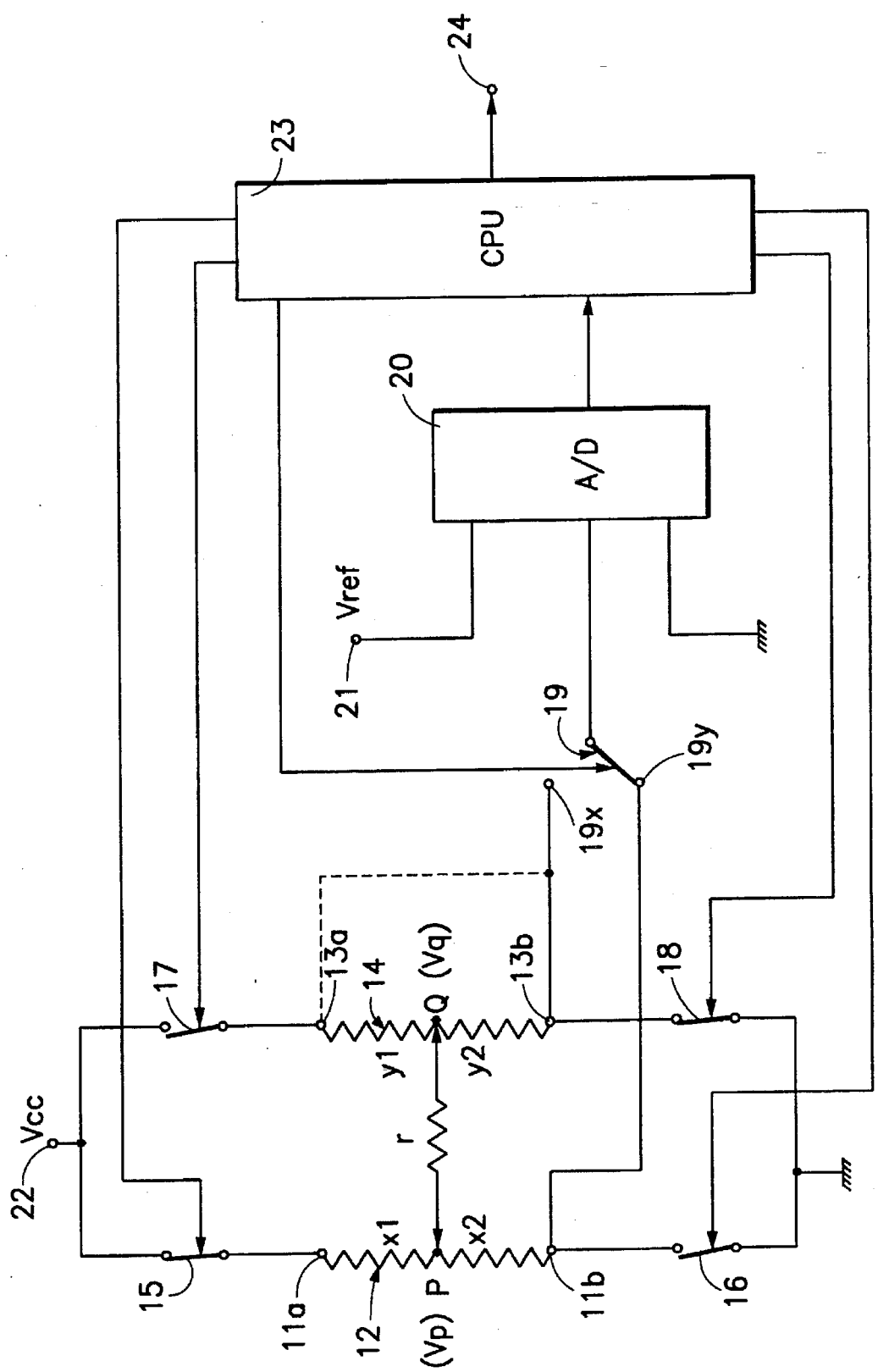
FIG. 2 is a circuit schematic of an embodiment of a resistive tablet system according to the present invention.
Figure 3:
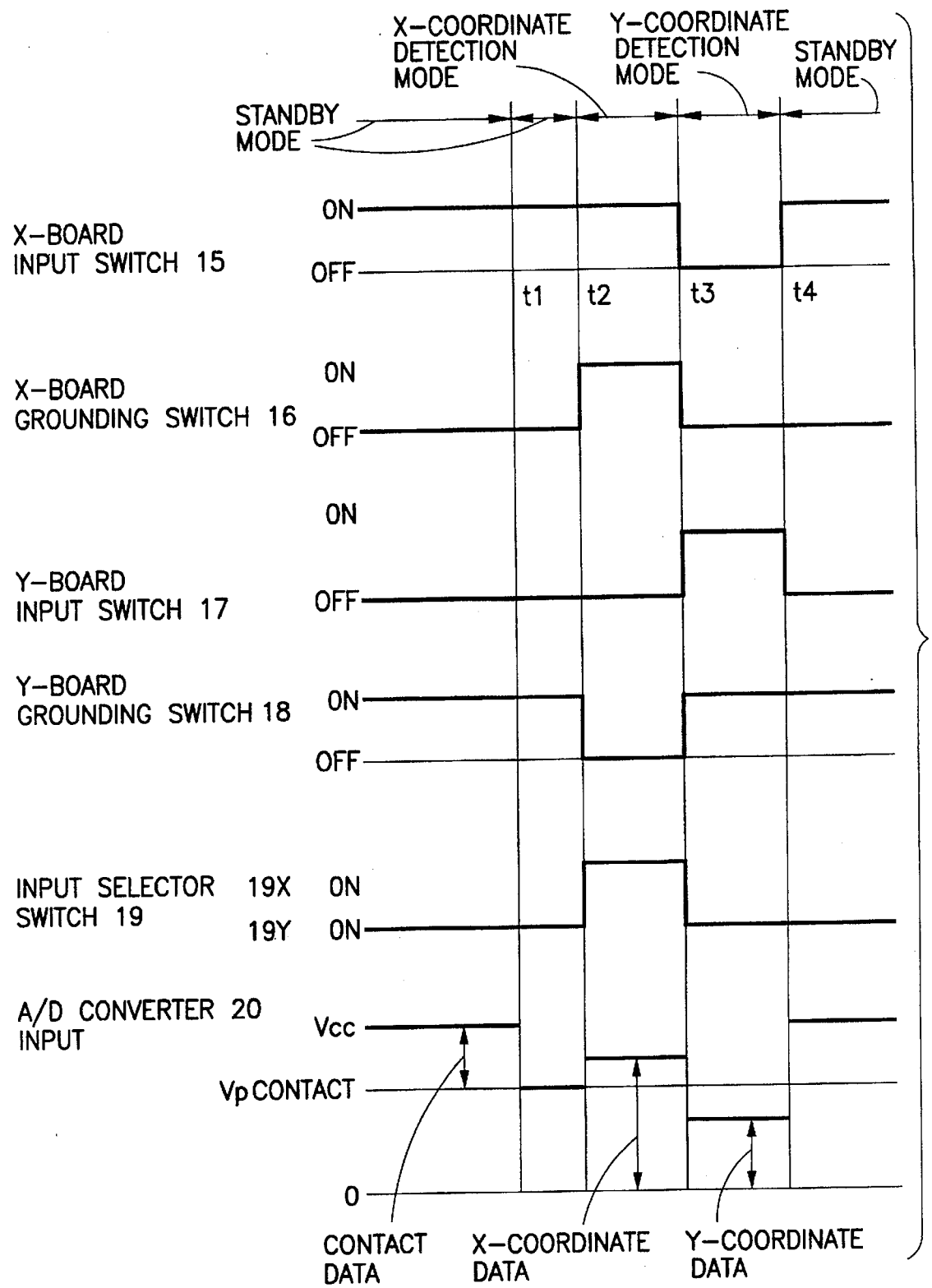
FIG. 3 is a waveform diagram showing a status of signals in the resistive tablet system of FIG. 3 resulting from application of a method of the present invention.

Referring to FIGS. 2 and 3, an embodiment of the tablet system of the present invention is shown which is similar to the prior art device of FIG. 1 except as noted herein. The present invention has an input to the A/D converter 20 which is not shunted to ground by a pull-down resistor on A/D converter side of the selector switch 19. A method of operation, detailed below, performed by the CPU 23 eliminates the need for the pull-down resistor 25 and its associated grounding switch 26 found in the prior art of FIG. 1.

When no contact is made with the resistive tablet 9, the tablet system is placed in a standby mode by the CPU 23. In the standby mode contact pressure on the tablet 9 is detected. When entering the standby mode the CPU 23 closes the X-board input switch 15 and the Y-board ground switch 18 while the selector switch 19 is set to the Y-input 19y which connects to the grounding electrode 11b of the X-board 12. The remaining switches are set in an open position. In this state, the input to the A/D converter 20 is pulled up to a potential of $V_{cc}$ since the A/D converter has a high impedance input to which $V_{cc}$ is applied via the X-board input switch 15, the resistances $x_1$ and $x_2$, and the selector switch 19. As long as the A/D converter measures the potential $V_{cc}$, the CPU 23 does not initiate a coordinate measurement routine because pressure has not been applied to the tablet 9.

At time $t_1$ pressure is applied to the tablet 9 resulting in a point of contact being made between the X-board 12 and the Y-board 14 at points P and Q respectively. This contact permits current to pass through the resistance $x_1$ via the contact resistance r and the resistance $y_1$. The current is channeled to ground via the Y-board grounding switch 18. A resultant potential $V_{p\ contact\ mode}$ at the point P is applied to the input of the A/D converter in place of the potential $V_{cc}$. The potential $V_{p\ contact\ mode}$ is determinable from the formula $$V_{p\ contact\ mode} = \frac{Vcc \times (r + y_2)}{x_1 + r + y_2}$$

Since this potential is lower than $V_{cc}$, the CPU 23 initiates the coordinate determination process when a digitized value lower than $V_{cc}$ is read from the A/D converter 20. If contact is made at the input electrode 11a of the X-board 12, residual resistances in circuit traces from a supply terminal 22 and contact resistances including those of the X-board input switch 15, which are not expressed in the above equation, produce a significant enough drop in voltage for contact to be recognized. In practice, a threshold value slightly below $V_{cc}$ can be used as a comparison value to prevent false detections. The threshold value need only be above the minimum expected drop in voltage. Thus, the need for the pull-down resistor 25 and the grounding switch 26 found in the prior art is eliminated.

Following the detection of a pressure contact at time $t_2$, the CPU 23 places the system in an X-coordinate determination mode. Both the X-board input and grounding switches, 15 and 16, are closed and the selector switch 19 is set to the X-input. The remaining switches are set open. As discussed above, the X-board 12 functions as a resistive divider network with a potential $V_p$ at point P measured via the Y-board 14.

After the determination of the X-coordinate, the CPU places the system in a Y-coordinate determination mode at time $t_3$. Both the Y-board input and grounding switches, 17 and 18, are closed and the selector switch 19 is set to the Y-input 19y. The remaining switches are set open. As described above, the Y-board 12 now functions as a resistive divider network with a potential $V_q$ at point Q measured via the X-board 12. Subsequent to the determination of both the X and Y coordinates, the CPU returns the system to the standby mode of operation at time $t_4$.

It is realized that an alternative embodiment of the present invention includes the connection of the X-input 19, of the selector switch 19, to the input electrode 13a of the Y-board 14. In such an arrangement the X coordinate is determined by measuring the potential $V_p$ via resistance $y_1$ instead of $y_2$. Since both the Y-board input and grounding switches, 17 and 18, are open during the determination of the X-coordinate either the ground electrode 13b or the input electrode 13a may be connected to the X-input 19x of the selector switch 19. Similarly, the input electrode 11a of the X-board 12 may be connected to the Y-input 19y of the selector switch 19. Both alternatives and their combination are considered to be within the scope and spirit of the present invention.

The embodiment of FIG. 2 uses the A/D converter 20 to detect contact made with the tablet 9 by sensing a drop in voltage from $V_{cc}$. This requires that the A/D converter 20 continuously perform conversions of the analog voltage at its input to a digital value which is repeatedly read by the CPU 23. This mode of operation requires that the CPU 23 monitor the A/D converter 20 output during standby periods when no data is actually being input via the tablet 9. During this period the CPU 23 could be performing other tasks and efficiency of system operation is diminished.

Figure 4:
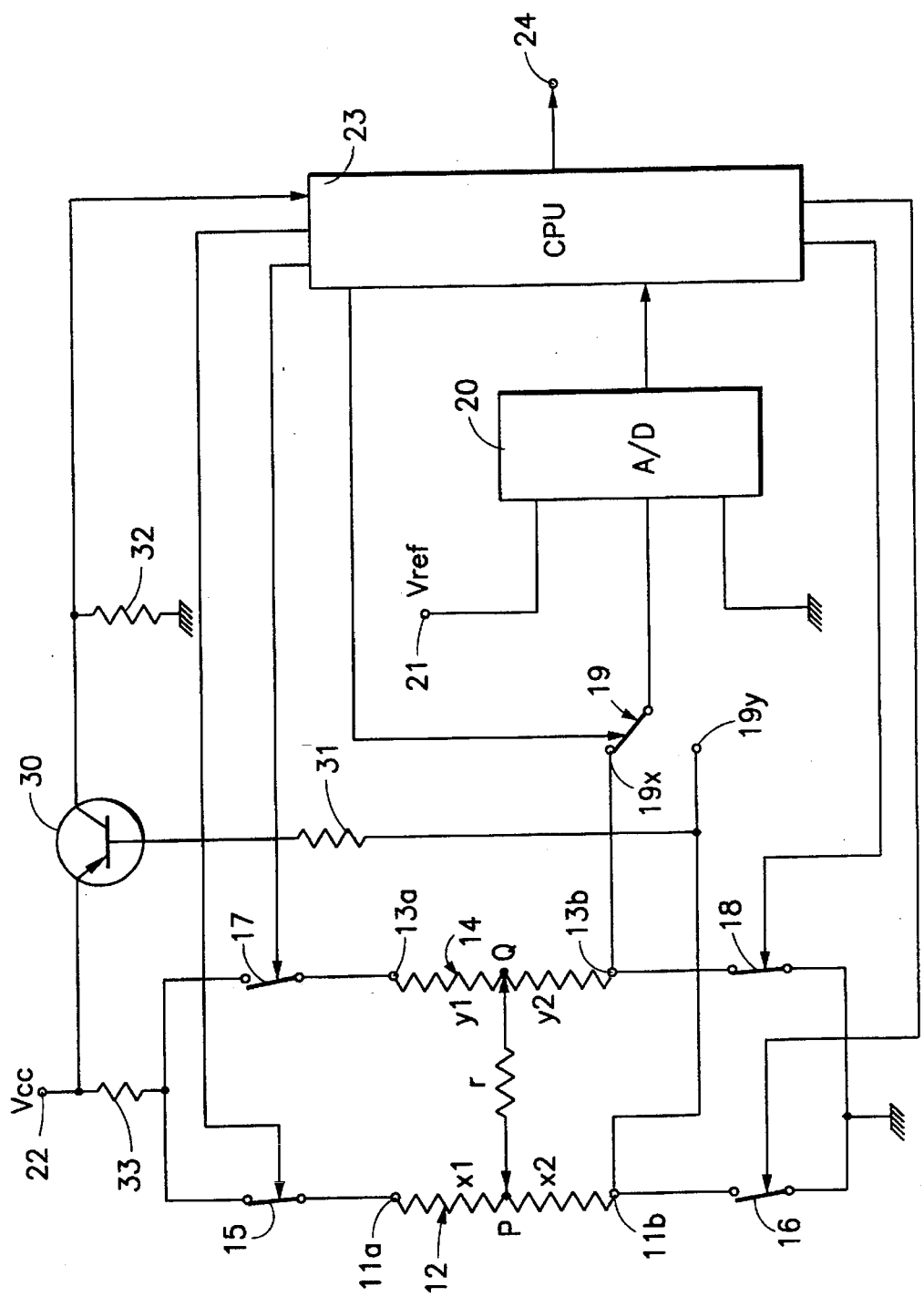
FIG. 4 is a circuit schematic of an embodiment of the present invention having a contact detection interrupt circuit.

Referring to FIG. 4, an alternative embodiment of the present invention is shown that eliminates the need for the CPU 23 to repeatedly read data from the A/D converter 20 and thereby increases system efficiency. The alternative embodiment is similar to the embodiment of FIG. 2 and is modified as stated herein. A switching transistor 30, driving a collector resistor 32, has a base input from the grounding electrode 11b of the X-board 12 via a base resistor 31 having a resistance $R_{31}$. The switching transistor 30 has an emitter connected to $V_{cc}$ and a voltage dropping resistor 33, having a resistance $R_{33}$, interposed between the supply terminal 22 and the X and Y board input switches, 15 and 17.

In the standby mode the X-board input switch 15 and Y-board grounding switch 18 are closed, the selector switch 19 is optionally set to the X-input 19x in preparation for an X-coordinate determination subsequent to the detection of contact being made with the tablet 9, and the remaining switches, 16 and 17, are set open. When contact is made with the tablet 9 at points P and Q, current is drawn through the voltage dropping resistor 33, and the resistances $x_1$, r, $y_2$. The voltage at point P, $V_{p\ contact}$, is applied via resistance $x_2$ and the base resistor 31 to the base of the switching transistor 30 in order to turn the switching transistor 30 on. The voltage $V_{p\ contact}$ is determined from the following formula $$V_{p\,contact} = \frac{V_{cc} \times (r + y_2)}{R_{33} + x_1 + r + y_2}$$

The voltage drop, $V_d$, from $V_{cc}$ at point P is determined by $$V_d = \frac{V_{cc} \times (R_{33} + x_1)}{R_{33} + x_1 + r + y_2}$$

Therefore, the resistances $R_{31}$ and $R_{33}$ are chosen such that the switching transistor 30 has a large enough potential across its base emitter junction to turned it on sufficiently for the CPU 23 to recognize a detection signal, generated across the collector resistor $R_{31}$ when $V_d$ is at a minimum potential. This minimum potential must take into account the point of contact being at the input electrode 11a and the point of contact Q being at the input electrode 13a. At this point the resistance $x_1$ is 0 while the resistance $y_2$ is at its maximum. Therefore, $R_{33}$ is selected to ensure a sufficient turned on voltage.

When the switching transistor 30 is turned on, the detection signal is a voltage generated across the collector resistor 32, substantially equal to $V_{cc}$ minus the saturation voltage of the switching transistor 30, this detection signal is applied to the CPU 23 in order to signal the CPU to begin the X and Y coordinate determination process.

The embodiment of FIG. 4 permits the determination of contact with the tablet 9 to be made without the need of a pull-down resistor 25 or a grounding switch 26, thus simplifying the circuit structure. Furthermore, the CPU 23 need not continuously read data from the A/D converter 20 because the switching transistor 30 signals when contact has been made with the tablet 9. Thus, the A/D converter is dedicated solely to the determination of the X and Y coordinates and control of the system is simplified.

An alternative configuration of the embodiment of FIG. 4 has a voltage sensing resistor between ground and the X and Y board ground switches, 16 and 18, instead of the voltage dropping resistor 33. The voltage developed across the voltage sensing resistor 15 is used similarly to turn on, or off, a switching transistor signal signaling the CPU 23 that contact has been made with the tablet 9. It is further realized that in each of the above embodiments of the present invention that one or both of the X and Y inputs, 19x and 19y, of the selector switch 19 may be connected in the alternative to the X and Y board input electrodes 11a and 11b. The above variations of the described embodiments are each considered to be within the scope and spirit of the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for detecting contact pressure at a point of contact on a digitizing tablet having first and second resistive boards, which comprises:

connecting a first edge of said first resistive board to a first potential and a first edge of said second resistive board to a second potential;

isolating said first and second resistive boards to prevent current flow therethrough absent said contact pressure being applied;

detecting a current flowing between said first and second potentials via said first resistive board, said point of contact, and said second resistive board when said contact pressure is applied; and initiating a coordinate determination routine in response to detecting said current;

said detecting including monitoring a potential at a second edge of one of said first resistive board and said second resistive board;

said second edge opposing said first edge of said one of said first resistive board and said second resistive board; and said detecting including detecting a change in said potential responsive to said current;

applying said detection signal to an interrupt of a controller to initiate said coordinate determination routine;

said detecting including applying said potential to a switching transistor responsive to said change in said potential;

biasing said switching transistor to generate a detection signal in response to said change in said potential resulting from a presence of said current;

said detecting including A/D converting said potential at said second edge of said one of said first resistive board and said second resistive board; and, detecting a change in a digital output of said A/D converter;

said detecting including generating an interrupt signal in response to said change in said potential; and applying said interrupt signal to an interrupt of a controller to initiate said coordinate determination routine.

2. A digitizing tablet system having a contact detection apparatus comprising:

a controller;

a digitizing tablet having first and second resistive boards, each having a resistive surface;

means for fixing said first and second resistive boards a predetermined distance apart to permit a contact pressure to deflect one of said first and second resistive boards and engage said resistive surface of each with one another at a point of contact;

said controller including connecting means for selectively connecting a first edge of said first resistive board to a first potential and a first edge of said second resistive board to a second potential, and isolating said first and second resistive boards to prevent current flow therethrough absent said contact pressure being applied;

detection means for detecting a current flowing between said first and second potentials via said first resistive board, said point of contact, and said second resistive board in response to said contact pressure being applied; and said controller including an initiation means, responsive to said detection means, for initiating a coordinate determination routine when said current is detected;

said detection means including means for monitoring a potential at a second edge of one of said first and second resistive boards;

said second edge opposing said first edge of said one of said first resistive board and said second resistive board;

said detection means including means for producing a change in said potential responsive to said current; and said detection means detecting said change in said potential, when said contact pressure is applied, thereby detecting said current;

said detection means further comprises:
an A/D converter having an input connected to said second edge of said one of said first resistive board and said second resistive board; and
said controller examining a digital output of said A/D converter for said change in said potential; and,
said detection means includes a switching transistor responsive to said change in said potential;
means for biasing said switching transistor to generate a detection signal in response to said change in potential produced by a presence of said current; and
applying said detection signal to an interrupt of said controller to trigger said initiation means.

3. A digitizing tablet system having a contact detection apparatus comprising:
a controller;
a digitizing tablet having first and second resistive boards, each having a resistive surface;
means for fixing said first and second resistive boards a predetermined distance apart to permit a contact pressure to deflect one of said first and second resistive boards and engage said resistive surface of each with one another at a point of contact;
said controller including connecting means for selectively connecting a first edge of said first resistive board to a first potential and a first edge of second resistive boards to prevent current flow therethrough absent said contact pressure being applied;
detection means for detecting a current flowing between said first and second potentials via said first resistive board, said point of contact, and said second resistive board in response to said contact pressure being applied; and said controller including an initiation means, responsive to said detection means, for initiating a coordinate determination routine when said current is detected;
said detection means including means for monitoring a potential at a second edge of one of said first and second resistive boards;
said second edge opposing said first edge of said one of said first resistive board and said second resistive board;
said detection means including means for producing a change in said potential responsive to said current; and
said detection means detecting said change in said potential, when said contact pressure is applied, thereby detecting said current;
said detection means further comprises:
an A/D converter having an input connected to said second edge of said one of said first resistive board and said second resistive board; and
said controller examining a digital output of said A/D converter for said change in said potential; and,
said detection means includes a switching transistor responsive to said change in said potential;
means for biasing said switching transistor to generate a detection signal in response to said change in potential produced by a presence of said current; and
applying said detection signal to an interrupt of said controller to trigger said initiation means
said means for producing a change in said potential including interposing a current sensing resistor between said first edge of said one of said first and second resistive boards and a respective one of said first and second potentials connected thereto.

* * * * *